United States Patent
Maeda et al.

(10) Patent No.: US 10,875,492 B2
(45) Date of Patent: Dec. 29, 2020

(54) HOOD HINGE

(71) Applicant: HONDA MOTOR CO., LTD., Tokyo (JP)

(72) Inventors: Jun Maeda, Wako (JP); Osamu Ito, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 31 days.

(21) Appl. No.: 16/363,228

(22) Filed: Mar. 25, 2019

(65) Prior Publication Data
US 2019/0299921 A1  Oct. 3, 2019

(30) Foreign Application Priority Data

Apr. 3, 2018 (JP) ................................. 2018-071302

(51) Int. Cl.
*B60R 21/38* (2011.01)
*B60R 21/0134* (2006.01)
*B62D 25/12* (2006.01)

(52) U.S. Cl.
CPC .......... *B60R 21/38* (2013.01); *B60R 21/0134* (2013.01); *B62D 25/12* (2013.01)

(58) Field of Classification Search
CPC ...... B60R 21/38; B60R 21/0134; B62D 25/12
See application file for complete search history.

(56) References Cited

U.S. PATENT DOCUMENTS

| | | | | |
|---|---|---|---|---|
| 7,552,789 B2* | 6/2009 | Gust | ...................... | B60R 21/38 180/69.21 |
| 7,931,111 B2* | 4/2011 | Kim | ...................... | B60R 21/38 180/274 |
| 8,484,804 B2* | 7/2013 | Mehta | ..................... | B60R 21/38 16/368 |
| 9,308,885 B2* | 4/2016 | Schabenbergers | ...... | B60R 21/38 |
| 9,701,277 B2* | 7/2017 | McIntyre | ................ | B60R 21/38 |
| 10,232,818 B2* | 3/2019 | Jenny | ...................... | B60R 21/38 |
| 10,315,613 B2* | 6/2019 | Patterson | .................. | E05D 3/06 |
| 10,336,291 B2* | 7/2019 | Schabenberger | ...... | B62D 25/12 |

FOREIGN PATENT DOCUMENTS

| | | |
|---|---|---|
| JP | 2003220973 A | 8/2003 |
| JP | 2010006315 A | 1/2010 |
| JP | 2014108651 A | 6/2014 |
| JP | 2016060469 A | 4/2016 |

OTHER PUBLICATIONS

English machine translation of Notice of Reasons for Refusal for JP Application No. 2018-071302, dated Sep. 3, 2019, 4 pages.

* cited by examiner

*Primary Examiner* — Faye M Fleming

(74) *Attorney, Agent, or Firm* — Armstrong Teasdale LLP

(57) ABSTRACT

A hinge base member (5) and a hinge upper member (15) of a hinge (1) for an engine hood (3) are provided with main bodies (5, 17) each having a laterally facing major plane, and link members (9, 10) are connected between the main bodies of the hinge base member and the hinge upper member and overlies the main bodies of the hinge base member and the hinge upper member from a first lateral side. The hinge upper member is provided with an extension (17) fixedly attached to the side part of the hood and extending forward from the main body of the hinge upper member with an offset to a second lateral side opposite to the first lateral side with respect to the main body of the hinge base member.

5 Claims, 6 Drawing Sheets

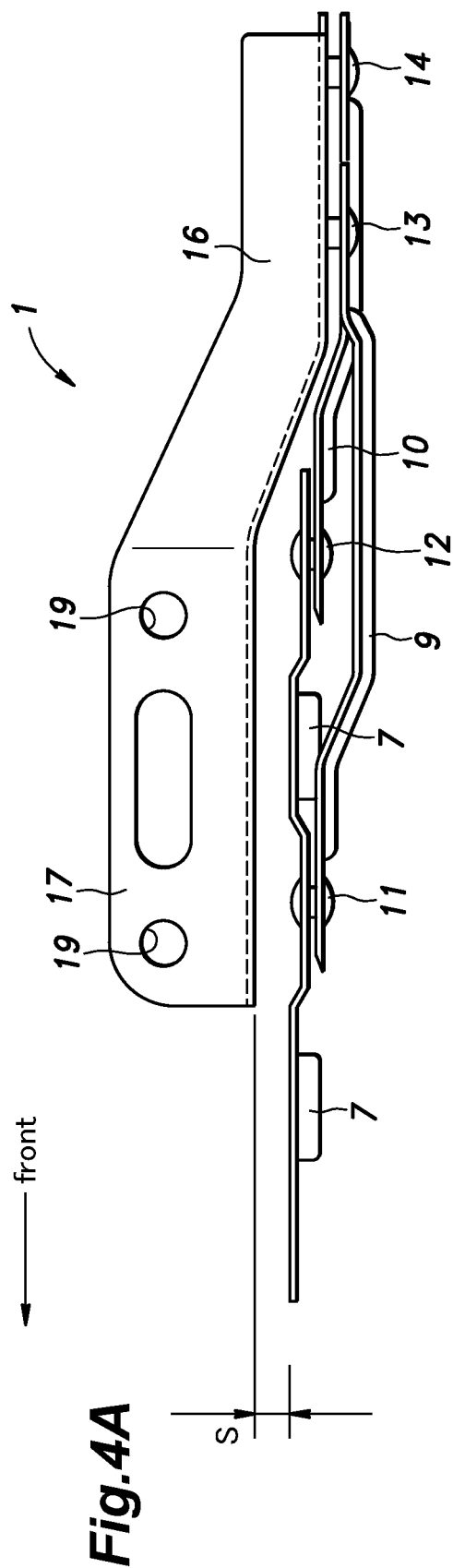
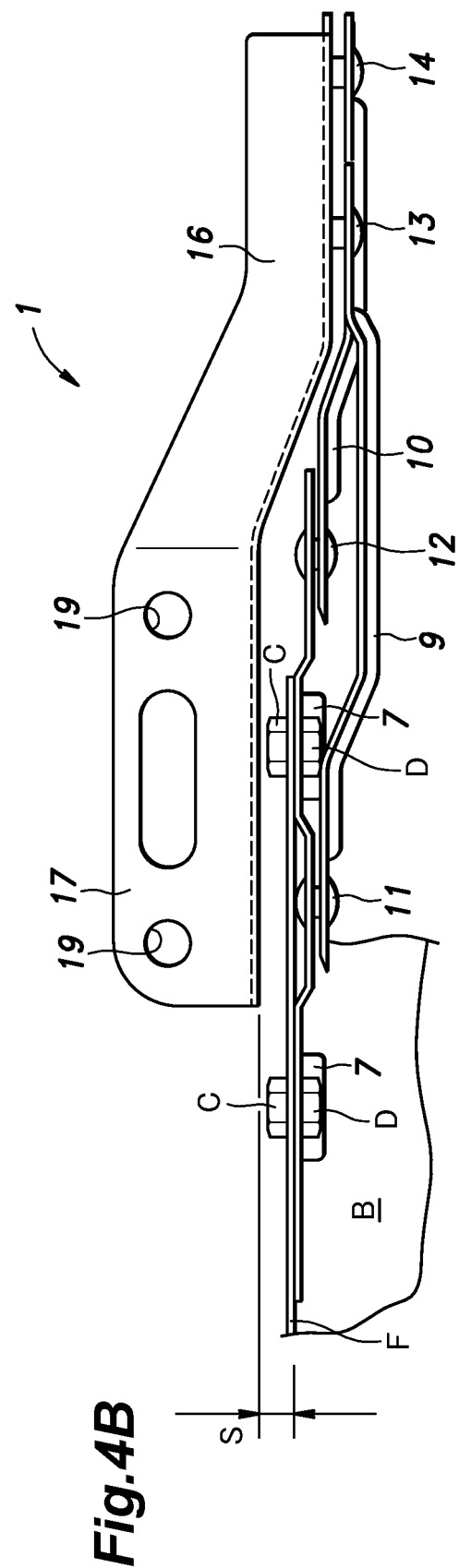

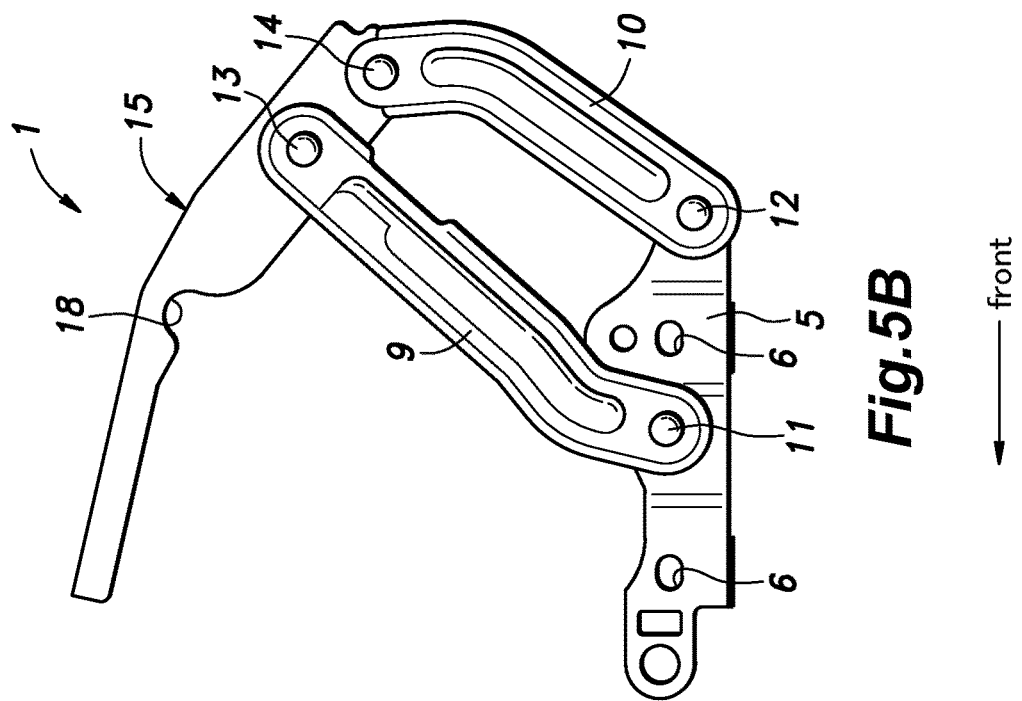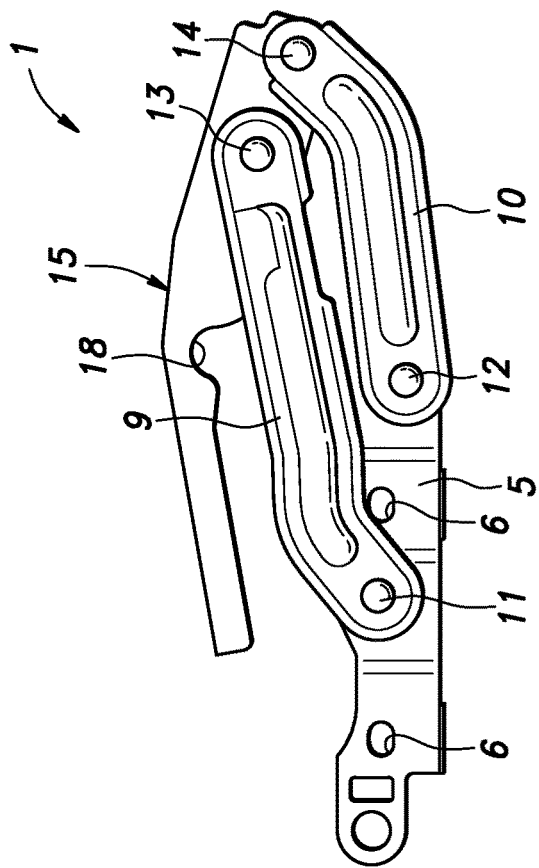

HOOD HINGE

TECHNICAL FIELD

The present invention relates to a hood hinge based on a four-bar linkage mechanism, and in particular to a hood hinge suitable for use as a hinge for an engine hood of a motor vehicle.

BACKGROUND ART

An engine hood for a motor vehicle is often provided with a periphery having a three dimensional configuration so as to conform to the profile of the adjacent part of the vehicle body for aesthetic reasons. In such a case, it is necessary to make sure that no part of the hood hinge interferes with the surrounding part of the vehicle body as the engine hood is opened and closed. JP2010-006315A discloses a hood hinge based on a four-bar linkage mechanism. By using an engine hood using a four-bar linkage mechanism, the rotational center of the engine hood is allowed to move along a prescribed locus. According to this prior art, the hinge is configured such that the rear end of the hood moves upward as the front end of the hood is raised so that the rear end of the hood may be prevented from interfering with the adjacent part of the vehicle body.

JP2003-220973A discloses an engine hood provided with a pop-up actuator for lifting a rear end part of the engine hood at the time of a crash with a pedestrian so that the impact load acting on the pedestrian may be reduced by raising the rear end part of the engine hood.

Since the four-bar linkage mechanism is more complex than a simple hinge having a fixed rotational center, various considerations are required in designing the hinge. In particular, when incorporating a pop-up actuator in the hood hinge, it is important to ensure an adequate downward deformation stroke to the hood hinge at the time of a crash with a pedestrian.

In view of such a problem of the prior art, a primary object of the present invention is to provide a hood hinge incorporated with a pop-up actuator that can provide a large amount of downward stroke when the pop-up actuator is deployed.

To achieve such an object, the present invention provides a hood hinge (1) configured to pivotally support a rear end of a hood (3) covering a front part of a vehicle body (2) from above, the hinge including a hinge base member (5) fixedly attached to the vehicle body, a hinge upper member (15) fixedly attached to a side part of the hood, and a pair of link members (9, 10) each having a rearward slant and connected between the hinge base member and the hinge upper member, wherein the hinge base member and the hinge upper member are provided with main bodies (5, 17) each having a laterally facing major plane, the link members overlying the main bodies of the hinge base member and the hinge upper member from a first lateral side, and the hinge upper member is provided with an extension (17) fixedly attached to the side part of the hood and extending forward from the main body of the hinge upper member with an offset to a second lateral side opposite to the first lateral side with respect to the main body of the hinge base member.

Thereby, as the engine hood descends toward the engine room after the engine hood has been popped up at the time of a crash with a pedestrian, owing to the lateral offset between the extension of the hinge upper member and the main body of the hinge base member, a relatively large downward stroke is ensured to the hinge upper member without being interfered by the hinge base member so that the impact on the engine hood can be mitigated at the time of a crash.

Preferably, the extension of the hinge upper member is spaced laterally from the main body of the hinge base member by a clearance as seen in plan view.

By defining the clearance between the extension of the hinge upper member and the main body of the hinge base member, the interference between these two parts can be positively ensured.

Preferably, the extension includes a plate member extending in a fore and aft direction continuously from the main body of the hinge upper member and having a laterally facing major plane, and a flange (17a) extending in the second lateral direction from an upper edge of the plate member, the flange being configured to be secured to the hood.

The extension can be provided with a high bending stiffness during normal operation owing an L-shaped cross section, and can provide a favorable support for the operation of the pop-up actuator at the time of a crash with a pedestrian.

Preferably, an end of each link member on a side of the hinge upper member is offset from another end of the link member on a side of the hinge base member to the first lateral side.

Thereby, the moment centered around the longitudinal axis (in the fore an aft direction) and acting on the hinge during normal operation can be minimized.

Preferably, the hood hinge further comprises a pop-up actuator configured to push up the flange of the extension of the hinge upper member at a time of an emergency, and a readily deformable part is provided in a boundary part between the main body and the extension of the hinge upper member.

The readily deformable part allows the force required to raise the extension and hence the rear end part of the hood to be minimized so that the power output of the pop-up actuator is not required to be unduly great.

Preferably, a guide portion (7) is formed by bending a lower edge of the main body of the hinge base member to the first lateral side.

The guide portion may be configured to rest upon a corresponding part of the vehicle body when securing the hinge base member to the vehicle body so that the work in mounting the hinge base member to the vehicle body by using fasteners such as threaded bolts can be facilitated.

The present invention thus provides a hood hinge incorporated with a pop-up actuator that can provide a large amount of downward stroke when the pop-up actuator is deployed.

BRIEF DESCRIPTION OF THE DRAWING(S)

FIG. 4A is a top view of the hood hinge;

FIG. 4B is a top view of the hood hinge including a fastening arrangement thereof;

FIG. 5A is a side view of the hood hinge in a closed state;

FIG. 5B is a side view of the hood hinge in an open state; and

DESCRIPTION OF THE PREFERRED EMBODIMENT(S)

A preferred embodiment of the present invention is described in the following with reference to the appended drawings.

Figure 1:
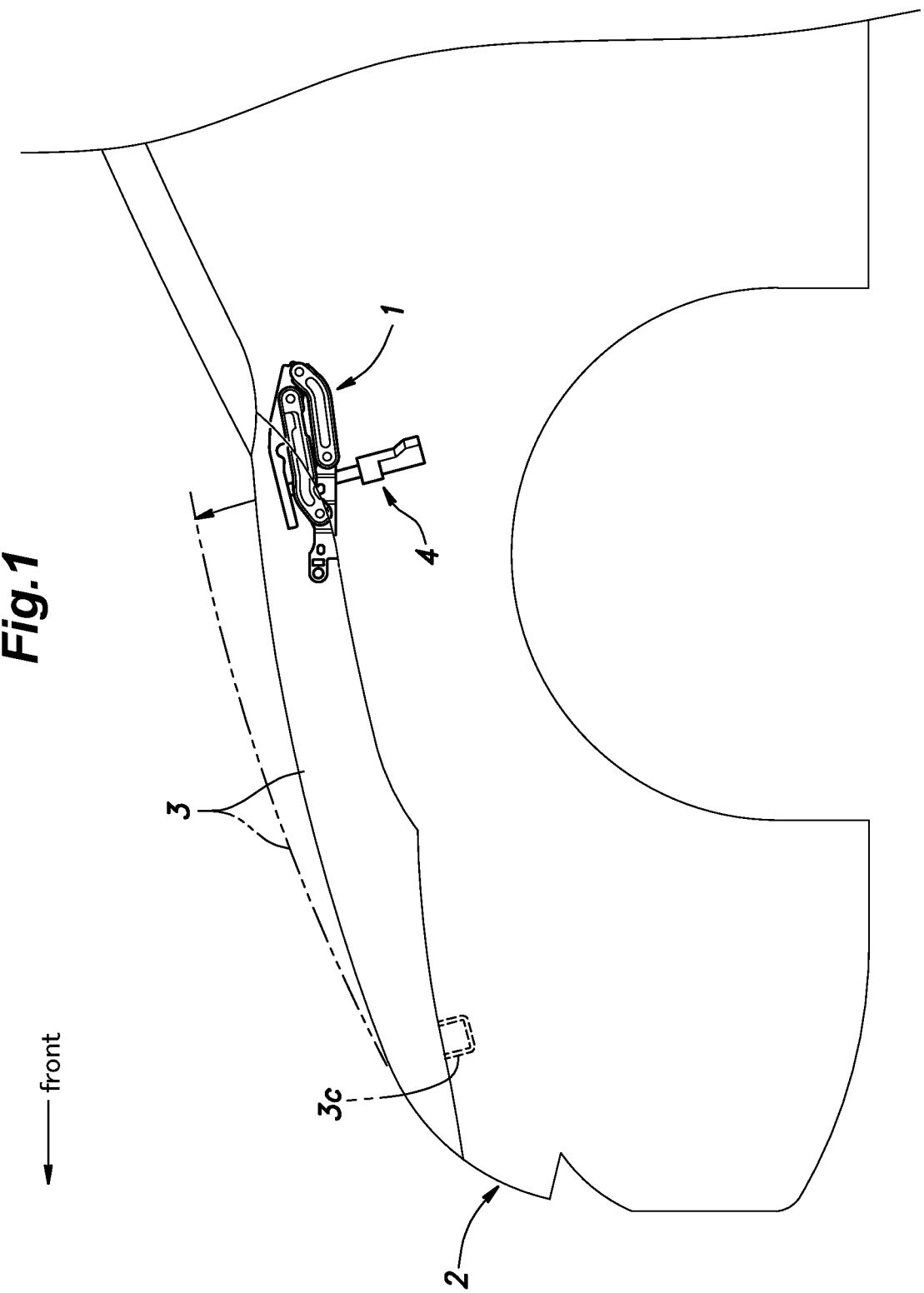
FIG. 1 is a schematic side view showing an overall arrangement of a hood hinge according to an embodiment of the present invention.

FIG. 1 shows a front part of a vehicle body 2 according to an embodiment of the present invention. The vehicle body 2 defines an engine room in the front part thereof to receive a power train and other devices. The upper opening of the engine room is covered by an engine hood 3. The engine hood 3 is composed of a hood frame 3a, and a hood skin 3b overlaid on the upper side of the hood frame 3a and hemmed onto the hood frame 3a along the outer periphery thereof. The hood frame 3a and the hood skin 3b may be made of steel or aluminum alloy sheet metal, or composite material such as fiber reinforced plastic. The engine hood 3 is inclined and curved so as to get gradually lower as it extends forward and laterally outward, and conforms to the outer profile of the part of the vehicle body 2 surrounding the engine hood 3.

The rear end of the engine hood 3 is supported by upper side members B provided on either side of the vehicle body 2 via a pair of hood hinges 1, respectively. The hood hinges 1 allow the front end of the engine hood 3 to be lifted and lowered around a laterally extending rotational center line.

Figure 2:
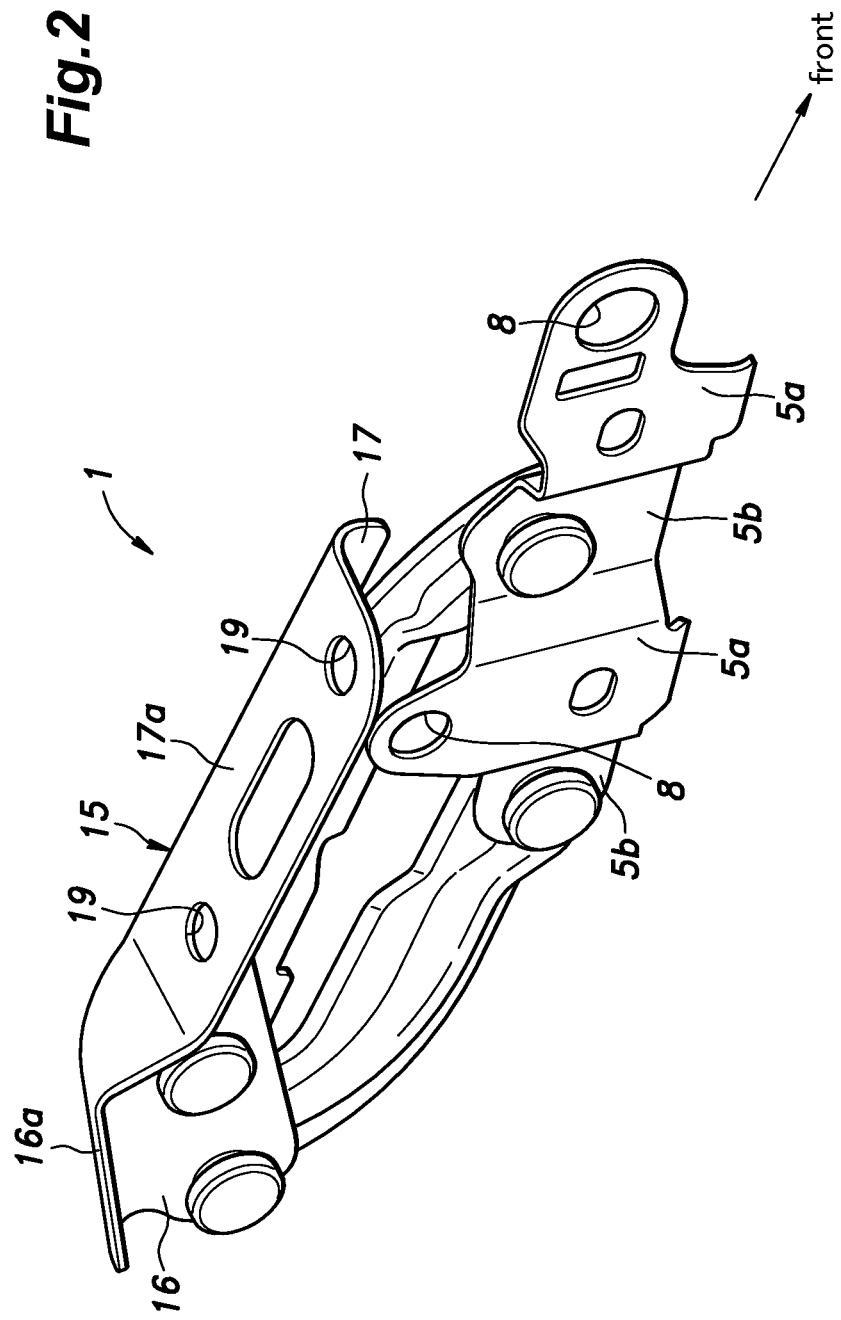
FIG. 2 is a perspective view of the hood hinge shown in FIG. 1.
Figure 3:
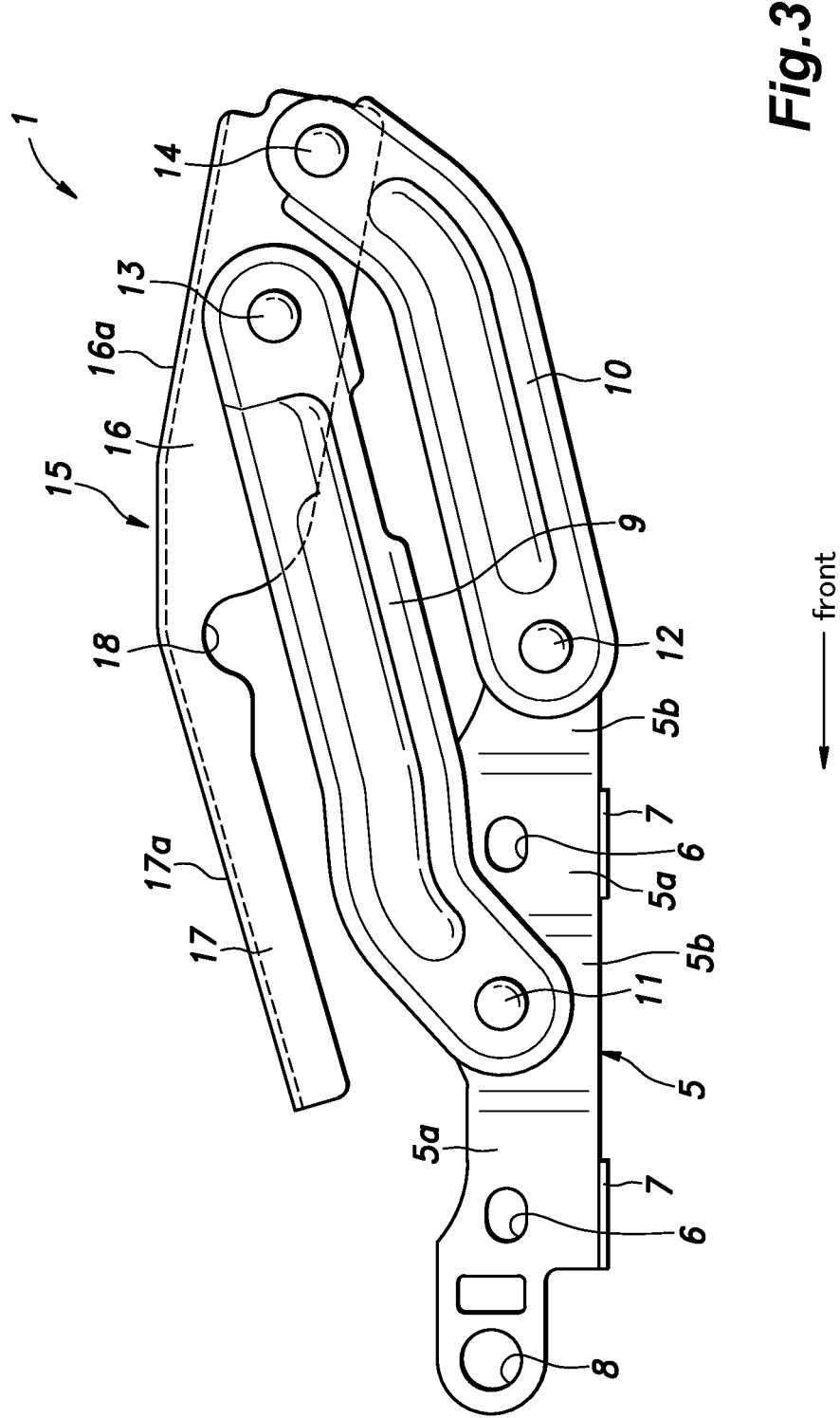
FIG. 3 is a side view of the hood hinge.
Figure 6:
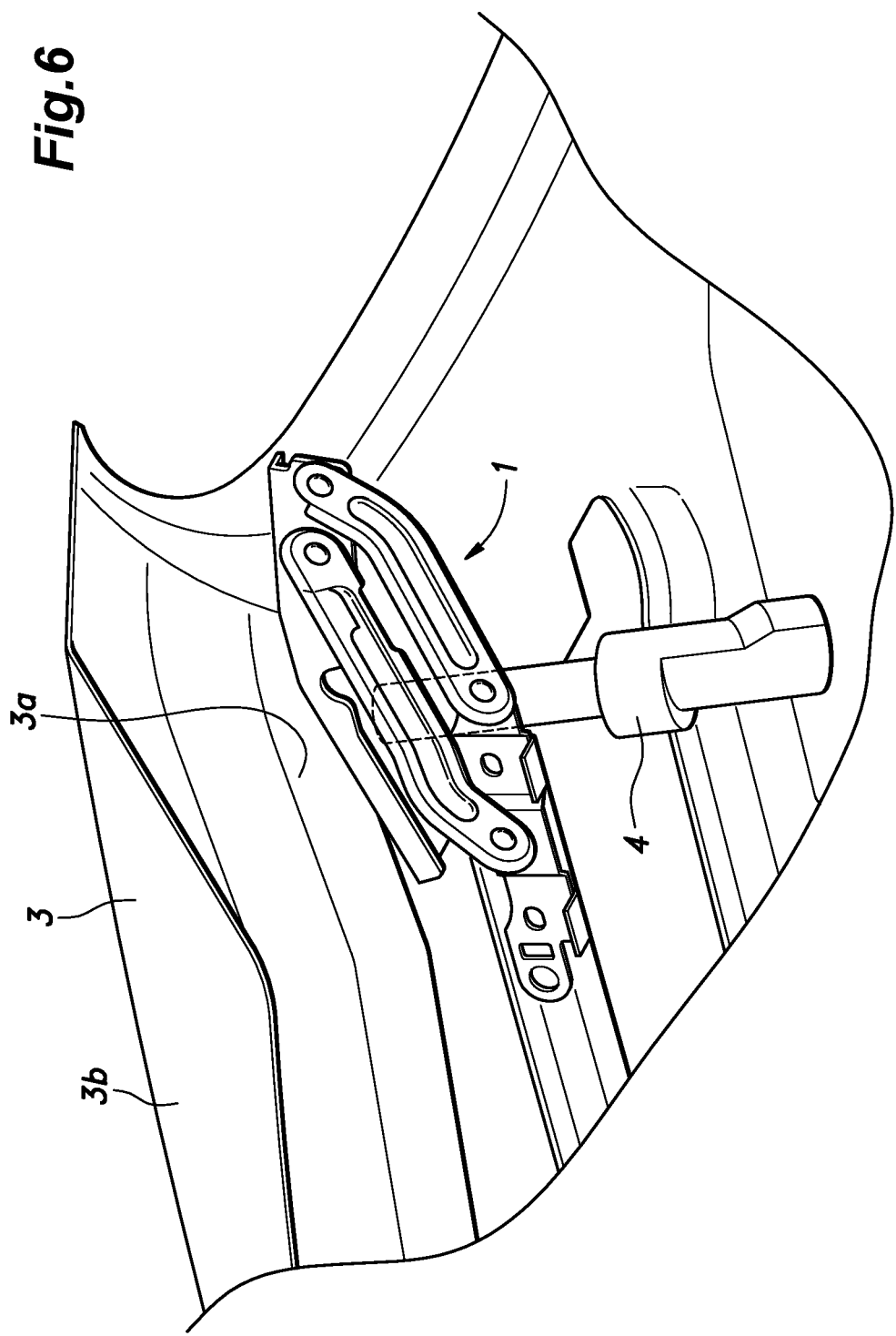
FIG. 6 is a fragmentary perspective view of the hood hinge and an associated pop-up actuator.

Since the engine hood 3 and the hinges 1 are symmetric about a central longitudinal line, only the left hinge 1 is discussed in the following to avoid redundancy. Referring to FIGS. 2 to 4, the hood hinge 1 includes a hinge base member 5 fixedly attached to the upper side member B of the vehicle body 2. The hinge base member 5 is made of a metallic plate member having a major plane facing sideways, and elongated in the fore and aft direction.

The hinge base member 5 is provided with a number of vertical folding lines so as to form a pair of body mounting parts 5a and a pair of link mounting parts 5b in an alternating manner in the fore and aft direction. The body mounting parts 5a extend along a plane parallel to the major plane, and are each formed with a fastening hole 6 for receiving a fastening bolt for securing the hinge base member 5 to the vehicle body 2, and a guide piece 7 projecting from the lower edge of the body mounting part 5a and bent in the outboard direction. The front end of the front body mounting parts 5a is provided with a positioning hole 8 for positioning the hinge base member 5 with respect to the vehicle body 2 by fitting a corresponding projection (not shown in the drawings) projecting from the vehicle body 2 into the positioning hole 8. A similar positioning hole 8 is provided in an upper part of the rear positioning hole 8 (FIG. 2).

The hinge base member 5 is configured to be attached to an upwardly extending flange F of the upper side member B by aligning the positioning holes 8 of the hinge base member 5 with the corresponding projections of the vehicle body 2, and then passing fastening bolts C through the respective fastening holes 6 so as to thread into respective welded nuts D welded to the flange F. In the illustrated embodiment, the hinge base member 5 is attached to the outboard side of the flange F. The guide pieces 7 extending from the body mounting part 5a allow the hinge base member 5 to be properly positioned by abutting an opposing upper surface of the upper side member B of the vehicle body 2.

The link mounting parts 5b also extend along a plane parallel to the major plane, and are connected to lower ends of a first link member 13 and a second link member 14 via pins 11 and 12, respectively. The lower ends of the two link members 13 and 14 are placed against the outboard side of the hinge base member 5. The two link members 13 and 14 extend upward and rearward, and are each provided with a rib for reinforcement. The two link members 13 and 14 are each appropriately bent at a suitable part thereof as seen from sideways so as not to interfere with each other as the two link members 13 and 14 perform the prescribed movements thereof. Also, the upper parts of the two link members 13 and 14 are offset from the lower parts thereof in the outboard direction in parallel with the lower parts of the respective link members 13 and 14.

The hood hinge 1 is further provided with a hinge upper member 15 including a main body 16 having a major plane facing sideway and extending in the fore and aft direction. The upper edge of the main body 16 is bent in the inboard direction so as to form a flange 16a. The hinge upper member 15 further includes an extension 17 continuously extending from the front end of the main body 16, and a flange 17a extending continuously from the front end of the flange 16a of the main body 16. The flange 17a may also be considered as being bent from the upper edge of the extension 17, and as a part of the extension 17. As can be seen in FIG. 4A, the extension 17 is offset from the main body 16 in the inboard direction, and the extension 17 and the main body 16 (the flange F of the upper side member B) extend substantially in the fore and aft direction parallel to each other. In particular, this offset creates a clearance S between the main body of the hinge base member 5 (the flange F of the upper side member B) and the flange 17a of the extension 17.

The flange 17a of the extension 17 is provided with a pair of mounting holes 19, and is placed against the hood frame 3a. The hinge upper member 15 can be attached to the hood frame 3a by passing the fastening bolts C through the mounting holes 19 and threading the fastening bolts C into the welded nuts D welded to the hood frame 3a. The pop-up actuator 4 is attached to a structural member of the vehicle body 2, and the output end thereof opposes or abuts the flange 17a of the extension 17A. A notch 18 is provided in a boundary between the main body 16 and the extension 17 to serve as a readily deformable part. In the illustrated embodiment, the notch 18 is provided between the main body 16 of the hinge upper member 15 and the extension 17 (the main body of the extension 17).

The mode of operation of the hood hinge 1 of the illustrated embodiment is described in the following.

When the hood 3 is closed as shown in FIG. 5A, the two link members 9 and 10 are positioned one above the other with a small gap defined therebetween, and the extension 17 of the hinge upper member 15 is disposed substantially horizontally. As the hood 3 is raised at the front end thereof, the hinge upper member 15 is caused to tilt so that the front end thereof rises higher than the rear end thereof. At the same time, the two link members 9 and 10 are raised upward at the rear (upper) ends thereof so that the hinge upper member 15 is raised generally upward. Thus, owing to the action of the four-bar linkage mechanism formed by the hinge upper member 15, the two link members 9 and 10, and the hinge base member 5, the hinge upper member 15 undergoes a rearward tilting movement and an upward and forward translational movement at the same time. As a result, the rear edge of the hood 3 is prevented from interfering with the adjacent part of the vehicle body 2.

The pop-up actuator 4 is configured to be activated upon detecting a crash with a pedestrian. The pop-up actuator 4 is incorporated with a pyrotechnical device that drives a piston, and the output end connected to the piston pushes up the hinge upper member 15, in particular the extension 17 thereof. The activation of the pop-up actuator 4 causes the rear end of the hood 3 to be lifted by about 10 cm, and this creates a stroke for plastic deformation of the hood 3 when an object collides with or pushes onto the hood 3 so that the impact energy of the crash can be converted into the deformation of the hood 3.

Upon activation of the pop-up actuator 4, the main body 16 of the hinge upper member 15 is pulled upward along an arcuate locus centered around the front end of the hood 3 where the hood 3 is engaged by a hood latch (not shown in the drawings). The extension 17 follows the arcuate movement of the rear end of the hood 3, but the main body 16 of the hinge upper member 15 is forced to move upward and rearward owing to the constraint imposed thereon by the four-bar linkage mechanism. According to the illustrated embodiment, owing to the presence of the notch 18 (readily deformable part), the extension 17 can bend relative to the main body 16 at such a time so that the rear end of the hood 3 can be raised to a prescribed height, and the impact applied to an object crashing upon the hood 3 can be favorably mitigated. It also means that the power output of the pop-up actuator 4 is not required to be unduly great.

When a downward force is applied to the hood hinge 1 at the time of a crash with an object such as a pedestrian, owing to the presence of the notch 18 (readily deformable part), the extension 17 can bend relative to the main body 16 so that the hood hinge 1 contributes to the mitigation of impact on the object that has crashed onto the hood 3 and allows the hood 3 to be deformed in a favorable manner.

In the illustrated embodiment, the extension 17 of the hinge upper member 15 is laterally offset from the main body of the hinge base member 5 so as to define a clearance S therebetween in plan view. Therefore, when the hinge upper member 15 is pressed downward along with the surrounding part of the hood 3 under the load of an object which has crashed onto the hood 3, the extension 17 of the hinge upper member 15 is prevented from interfering with the hinge base member 5 or any other part of the hinge 1 so that the hinge 1 along with the surrounding part of the hood 3 can deform in a downward direction without interfering with other parts of the hinge 1 or the vehicle body. In other words, the hinge 1 of the illustrated embodiment allows the deformation stroke of the rear end part of the hood 3 at the time of a crash to be maximized, In the hinge 1 of the illustrated embodiment, the two link members 9 and 10 are each provided with bending lines in a middle part thereof so that the upper part of the link member is offset from the lower part thereof in the inboard direction. As a result, the moment applied to each link member 9, 10 with respect to the lateral direction during normal operation of the hinge 1 can be minimized so that the bending load acting on the link member can be minimized.

Although the present invention has been described in terms of a preferred embodiment thereof, the present invention is not limited by such an embodiment, but can be modified in a number of different ways without departing from the spirit of the present invention. For instance, the present invention is applicable even when the pop-up mechanism is absent. Also, the hood for which the hinge is used not limited to an engine hood, but may be a trunk lid or any other lid for closing a space in a vehicle.

The invention claimed is:

1. A hood hinge configured to pivotally support a rear end of a hood covering a front part of a vehicle body from above, the hinge including a hinge base member fixedly attached to the vehicle body, a hinge upper member fixedly attached to a side part of the hood, and a pair of link members each having a rearward slant and connected between the hinge base member and the hinge upper member, wherein the hinge base member and the hinge upper member are provided with main bodies each having a laterally facing major plane, the link members overlying the main bodies of the hinge base member and the hinge upper member from an outboard side, and the hinge upper member is provided with an extension fixedly attached to the side part of the hood and extending forward from the main body of the hinge upper member with an offset to an inboard side with respect to the main body of the hinge base member, wherein an end of each link member on a side of the hinge upper member is offset from another end of the link member on a side of the hinge base member to the outboard side.

2. The hood hinge according to claim 1, wherein the extension of the hinge upper member is spaced laterally from the main body of the hinge base member by a clearance as seen in plan view.

3. The hood hinge according to claim 1, wherein the extension includes a plate member extending in a fore and aft direction continuously from the main body of the hinge upper member and having a laterally facing major plane, and a flange extending toward the inboard side from an upper edge of the plate member, the flange being configured to be secured to the hood.

4. A hood hinge configured to pivotally support a rear end of a hood covering a front part of a vehicle body from above, the hinge including a hinge base member fixedly attached to the vehicle body, a hinge upper member fixedly attached to a side part of the hood, and a pair of link members each having a rearward slant and connected between the hinge base member and the hinge upper member, wherein the hinge base member and the hinge upper member are provided with main bodies each having a laterally facing major plane, the link members overlying the main bodies of the hinge base member and the hinge upper member from a first lateral side, and the hinge upper member is provided with an extension fixedly attached to the side part of the hood and extending forward from the main body of the hinge upper member with an offset to a second lateral side opposite to the first lateral side with respect to the main body of the hinge base member, wherein the hood hinge further comprises a pop-up actuator configured to push up a flange of the extension of the hinge upper member at a time of an emergency, and a readily deformable part is provided in a boundary part between the main body and the extension of the hinge upper member.

5. A hood hinge configured to pivotally support a rear end of a hood covering a front part of a vehicle body from above, the hinge including a hinge base member fixedly attached to the vehicle body, a hinge upper member fixedly attached to a side part of the hood, and a pair of link members each having a rearward slant and connected between the hinge base member and the hinge upper member, wherein the hinge base member and the hinge upper member are provided with main bodies each having a laterally facing major plane, the link members overlying the main bodies of the hinge base member and the hinge upper member from a first lateral side, and the hinge upper member is provided with an extension fixedly attached to the side part of the hood and extending forward from the main body of the hinge upper member with an offset to a second lateral side opposite to the first lateral side with respect to the main body of the hinge base member, wherein a guide portion is formed by bending a lower edge of the main body of the hinge base member to the first lateral side.

\* \* \* \* \*